Figure 1:
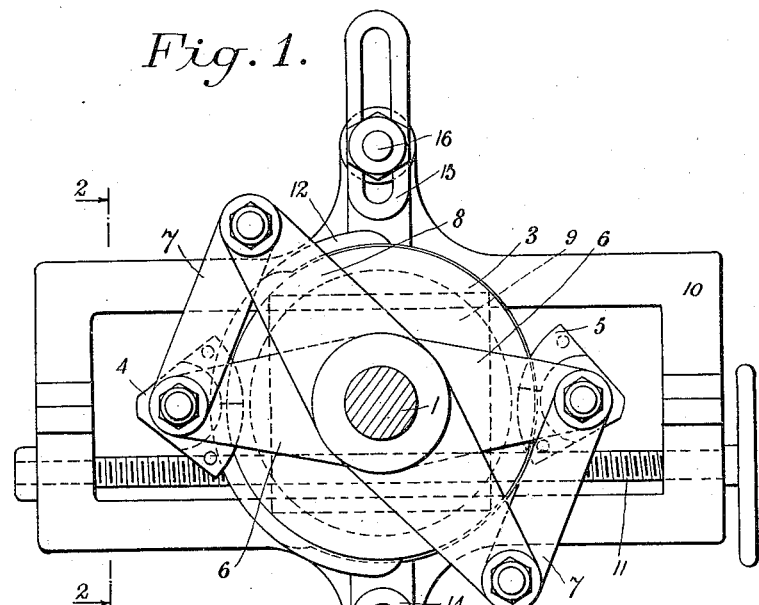

J. DRURY & F. J. GRAY.
SPEED CHANGING MECHANISM.
APPLICATION FILED AUG. 5, 1914.

1,173,493.

Patented Feb. 29, 1916.
4 SHEETS—SHEET 1.

WITNESSES.
M. H. Brakhagen
G. C. Denny

INVENTORS
John Drury and
Frank James Gray
by Foster Freeman Watson & Cort Attys

J. DRURY & F. J. GRAY.
SPEED CHANGING MECHANISM.
APPLICATION FILED AUG. 5, 1914.

1,173,493.

Patented Feb. 29, 1916.
4 SHEETS—SHEET 2.

J. DRURY & F. J. GRAY.
SPEED CHANGING MECHANISM.
APPLICATION FILED AUG. 5, 1914.

1,173,493.

Patented Feb. 29, 1916.
4 SHEETS—SHEET 3.

WITNESSES.

INVENTORS

J. DRURY & F. J. GRAY.
SPEED CHANGING MECHANISM.
APPLICATION FILED AUG. 5, 1914.

1,173,493.

Patented Feb. 29, 1916.
4 SHEETS—SHEET 4.

UNITED STATES PATENT OFFICE.

JOHN DRURY AND FRANK JAMES GRAY, OF LONDON, ENGLAND.

SPEED-CHANGING MECHANISM.

1,173,493.   Specification of Letters Patent.   Patented Feb. 29, 1916.

Application filed August 5, 1914. Serial No. 855,160.

*To all whom it may concern:*

Be it known that we, JOHN DRURY and FRANK JAMES GRAY, both subjects of His Majesty the King of Great Britain and Ireland, and residents of London, England, have invented a certain new and useful Improved Speed-Changing Mechanism, of which the following is a specification.

This invention relates to speed changing mechanism for varying the relative speeds of a driving and driven member of the kind in which a ratchet wheel or the like is secured upon the driven member and is adapted to be driven by pawls or the like so connected with the driving member that on moving the driven member eccentrically to the driving member a variation in speed of the driven member is produced.

The invention has for its object to provide an improved arrangement of speed gear of the above class which may be driven in both directions and which is adapted to provide an infinite number of reduced speeds for the driven shaft below the speed of the driving member, within the limits of the gear, the highest speed being the direct drive or the speed of the driving member. To this end according to the invention variable means are provided, for lifting the pawls or the like out of driving engagement during the moments of their highest peripheral speed, said means being automatically variable with the eccentric movement of the driven member for the purpose of varying the lifting out periods of the pawls or the like, so that an infinite number of reduced speeds lower than that of the driving member can be obtained within the limits of the gear. These variable means may consist of a variable or compound cam or cams.

In carrying out the invention a rotary surface such as a grooved wheel is fixed to the driven member, and engaging alternately with the groove of the said grooved wheel are two eccentric V-shaped friction or wedging pawls, each of the said pawls being attached to a link carried by a crank which is fixed to the driving member, the said cranks being fixed opposite to one another. When the said driving and driven members are co-axial the mechanism does not produce any variation of speed; but when by means of a slide block and bearing or other suitable means one of the said members is moved out of alinement with the other the said pawls move alternately fast and slow and the compound cam prevents the fast moving pawl from engaging with the said grooved wheel.

The compound or variable cam employed may consist of two cam plates loosely mounted on the driven member one behind the other at the back of the wheel or the like provided on said member, each cam plate being provided with an arm having a slot working on a pin connection to a fixed portion of the frame or other part of the device. On the eccentric movement of the driven member the aforesaid positions of these cam plates are automatically varied and by the engagement of their outer edges with the pawls hold same out of action to varying degrees depending upon the eccentricity between the driving and driven members.

In order to provide for a reverse rotation of the driven member, or for the driving member to be driven by the driven member, double acting pawls may be used. The mechanisms may be used singly, or in order to increase the difference between the two extreme speeds any number of the mechanisms may be used in train. Preferably a pair or any number of pairs of mechanisms may be used, the first of each pair being movable out of alinement and the second being stationary, whereby the alinement of the two portions of the shaft may be preserved.

To enable the invention to be fully understood it will now be described by reference to the accompanying drawings, in which:—

Figure 2:
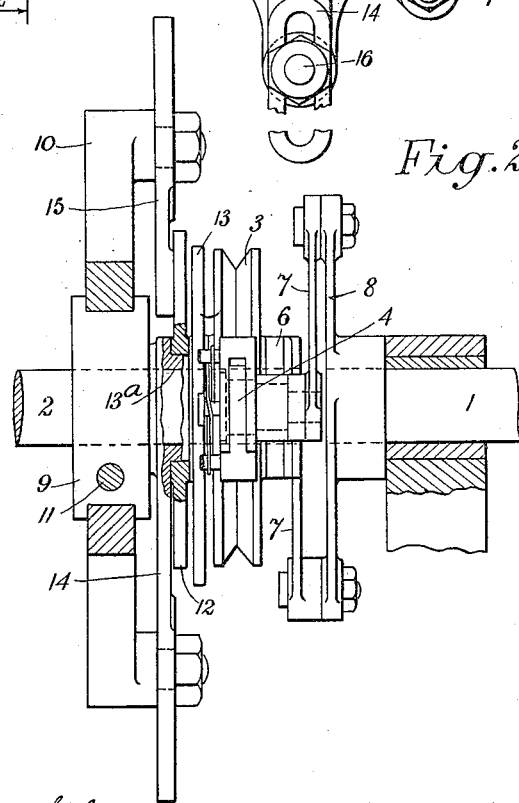
Figure 5:
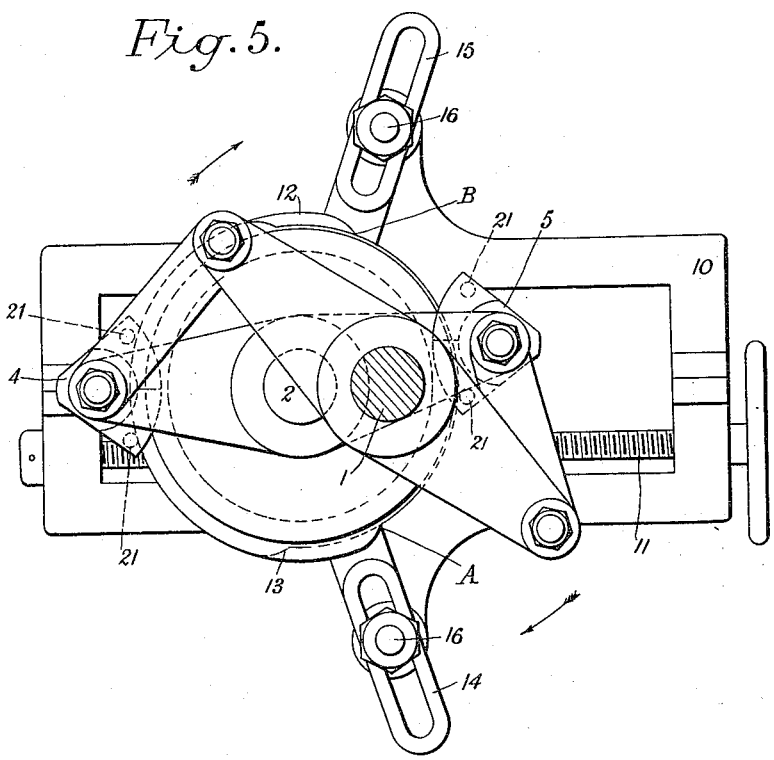
Figure 3:
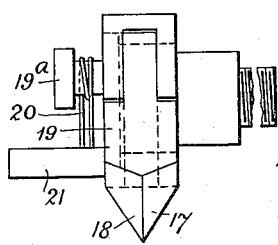
Figure 4:
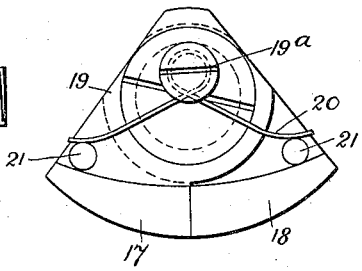
Figure 6:
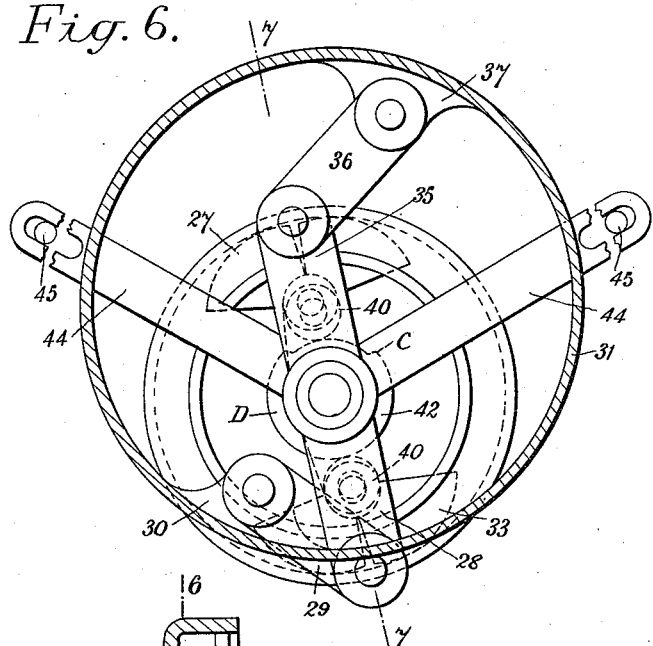
Figure 7:
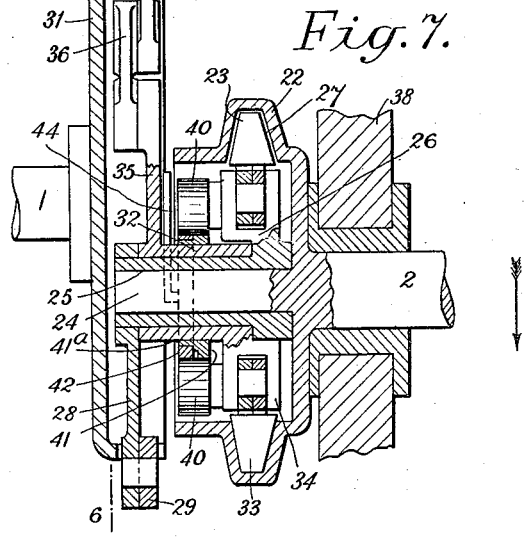
Figure 8:
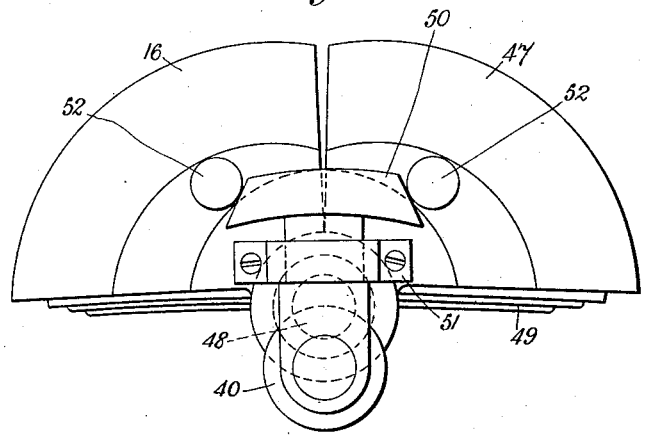
Figure 9:
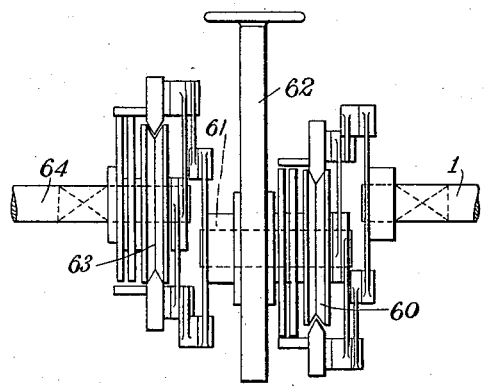

Figure 1 is a front elevation in diagrammatic form of a speed changing device constructed according to one form of the invention and adapted to decrease the speed of a driven member relative to that of a driving member, the parts being in the positions occupied when the driving and driven members are operated at similar speeds. Fig. 2 is a part sectional side elevation of same on line 2, 2, Fig. 1. Figs. 3 and 4 are details of the pawl mechanism. Fig. 5 is a view similar to Fig. 1 but showing the parts in one of the positions occupied when it is desired to reduce the speed of the driven member, Fig. 6 is a part sectional diagrammatic elevation of a modified form of speed changing mechanism constructed according to one form of the invention, the section being taken on line 6, 6, in Fig. 7. Fig. 7 is a section on the line 7, 7, Fig. 6. Fig. 8 is a detail of one of the pawls employed in the form shown in Figs. 6 and 7. Fig. 9 is a diagrammatic view showing a pair of speed changing devices constructed according to the invention and coupled together to produce greater variations of speed.

Referring first to Figs. 1 and 2. The device is here shown as interposed between a driving shaft or member 1 and a driven shaft or member 2 supported in suitable bearings. Secured upon the driven shaft 2 is a grooved wheel 3 which is adapted to be rotated by means of pawls 4, 5, each pivotally mounted on links 6, 7. The free ends of the links 6 are loosely mounted on the driven shaft 2, and the free ends of the links 7 are pivotally attached to the ends of an arm 8 secured upon the driving shaft 1 as shown. The driven shaft 2 is mounted in a slide block 9, adapted to be reciprocated between guides in a frame 10 by means of a screw 11 engaging with a suitable nut or the like on the slide block 9. It will be seen that on rotation of the driving shaft 1, the pawls 4, 5, will drive the wheel 3. When the shafts 1 and 2 are concentric as in the position shown in Fig. 1, then both pawls revolve at equal speeds since they are operated by linked arms of equal effective length, measured from the center of the driving shaft. If however the driven shaft 2 be displaced laterally, by turning the screw 11, into the position shown in Fig. 5 then it will be seen that the linked members change position and each pawl drives the wheel alternately through a long linked arm and a short linked arm, that is to say, the pawls travel at varying rates, the pawl on the longer arm moving faster than the pawl on the shorter arm. In order to decrease the speed of the driven shaft as same is moved eccentrically to the driving shaft, an adjustable or compound edge cam is provided which operates to lift the faster moving pawl out of engagement with the wheel 3 at the proper times allowing said wheel to be driven only by the slower moving pawl. This edge cam comprises two cam plates 12, 13, so mounted that they can move one over the other. The plate 13 is secured upon a sleeve 13$^a$ loose upon the shaft 2 said sleeve having an arm 14 attached thereto. The plate 12 is loosely mounted on the sleeve 13$^a$ between the plate 13 and the frame 10 and is provided with an arm 15. The free ends of the arms 14, 15 are slotted and are movably secured upon pins 16 in convenient positions on the frame 10 or other stationary part of the device. When the shaft 2 is displaced laterally the cam plates 12, 13 move one upon the other adjusting the periphery of the cam so formed to give the necessary timing to the pawls.

As shown in Fig. 5 the pawl 5 on the shorter linked arm is driving in the direction of the arrows and the pawl 4 being on the extended or faster moving linked arm is out of contact with the driving groove in the wheel 3, being on the raised portion of the cam. When the pawl 5 reaches the point A on the cam it will be raised out of driving contact with the wheel 3 until the point B is reached when it descends into driving engagement with the wheel. In the meantime the pawl 4 moving at a faster rate than pawl 5 will have descended on to the wheel at point B just before the pawl 5 is lifted out at A and will drive same through a short linked arm until it is in due course lifted away again at the point A. It will be understood that the cam surfaces are so arranged that one pawl is always in operative engagement with the wheel 3, the changes of drive from one pawl to the other overlapping so that a continuous drive of the shaft 2 is obtained. When the eccentricity of the shaft 2 relative to shaft 1 is increased the points A and B on the cam are correspondingly automatically changed due to relative movement of the plates 12, 13. The points A and B may be formed on either cam plate so long as the requisite adjustment is automatically obtained.

Figs. 3 and 4 show details of the pawls in end view and side view respectively. The pawls are preferably double acting so that the direction of the drive may be reversed. Each consists of two pawl portions 17, 18, pivoted upon the pin 19, one portion being for the forward drive and the other for the reverse. A spring 20 secured to the pin 19$^a$ has its free ends bearing on pins 21 one on each of the parts 17, 18, and tends to hold the latter in driving engagement with the wheel 3. The pins 21 are adapted to ride on or over the edges of the cam plates 12, 13, for the purpose of operating the pawls. It will be understood that any suitable construction of pawl may be employed.

Referring now to the form shown in Figs. 6 and 7. Secured upon the driven shaft 2 is a drum 22 having an internal groove 23 and a central shaft 24 which is a continuation of the said driven shaft. Loosely mounted upon said shaft 24 is a sleeve 25 having at one end a fork 26 between the prongs of which a pawl 27 is pivotally mounted. The other end of the sleeve carries a loose arm 28 connected by a link 29 with a lug 30 carried on the interior of a flanged plate 31 secured upon the driving shaft. A second sleeve 32, loosely mounted upon the sleeve 25 carries at one end a pawl 33 pivoted in a fork 34 and has at its other end an arm 35 connected by a link 36 with a lug 37 on the plate 31. The driven shaft 2 is mounted in a block 38 which is slidable relative to the driving shaft in any suitable manner. It will be obvious that if the shaft 2 is displaced in the direction of the arrow, then the links connected to the sleeves carrying the pawls will be moved as previously described with reference to the form shown in Figs. 1 to 5, so that each pawl drives alternately through a long and a short linked arm, that is to say one pawl will travel at a faster rate than the other. The flange of the plate 31 may be slotted at any suitable point or points to allow any of the links to project in certain positions of the device. In order to lift the faster moving pawl out of gear with the groove 23 to produce a reduced speed for the driven shaft each pawl has a roller 40 bearing on an adjustable cam. The said cam comprises two cam plates 41, 42, the plate 41 being mounted loosely on the sleeve 32 and having a short sleeve 41ª upon which the cam plate 42 is loosely mounted as shown. The two cam plates 41, 42 are carried on arms 43, 44 respectively, the outer ends of the arms being slotted, and engaging with pins 45 attached to any suitable stationary part of the mechanism as shown. With this construction, it will be obvious that if the shaft 2 is displaced in the direction of the arrow, then the cam plates 41, 42, will move one upon the other and change the periphery of the cam.

In the position shown in Fig. 6, the roller 40 of the pawl 27 is on the lower portion C of the cam and pawl 27 is driving the wheel. The other pawl 33 is out of action being on the raised portion of the cam D. The operation of the device is similar to that of the form shown in Figs. 1–5.

The pawls 27 and 33 are preferably double as shown in Fig. 8. In this figure a double pawl is shown comprising two pawls 46, 47, pivotally mounted upon a pin 48 one adapted to drive in one direction and the other in the opposite direction. A laminated spring 49 tends to press both pawls into contact with the wheel, the friction between the wheel and the driving pawl increasing as the pawl is moved, the idle pawl being carried around freely. The roller 40 is carried on a wedge shaped piece 50 adapted to slide between guides 51 on the fork holding the pawls said piece 50 bearing on two pins 52 one on each pawl. It will be obvious that when the roller 40 rides on the high part of the cam the two pawls will be forced apart out of contact with the wheel. The spring 49 forces one of said pawls into driving engagement when the roller rides on the lower part of the cam, according to the direction of the drive, one pawl acting to drive in one direction and the other in the opposite direction so that the directions of the drive may be reversed.

It will be understood that any suitable construction of pawl and cam or other suitable mechanism may be employed in carrying out the invention and that the mechanism may be mounted in any suitable form or manner. Although the driving and driven members have been shown as shafts, the application of the invention is not limited to shafts.

In order to produce greater variations in speed between the driving and driven shafts, two or more of the speed changing devices constructed according to the invention may be coupled together as shown diagrammatically in Fig. 9. In said Fig. 9, the driving shaft 1 drives a wheel 60 on one end of a shaft 61 slidably mounted in a suitable frame 62, by means of pawl and link mechanism such as shown in Fig. 1. The other end of the shaft 61 has the links of a second speed gear of the kind shown in Fig. 1 attached thereto which gear drives a wheel 63 on the driven shaft 64 from which the drive is taken. By displacing the shaft 61 laterally in the frame 62, the speed of the driven shaft 64 will be decreased relatively to the speed of the driving shaft in a geometrical progression. The speed may be still further varied by connecting a further speed changing device to the shaft 64 and so on. Preferably the devices will be connected together in a series of pairs as by such an arrangement the alinement of the driving and ultimate driven shaft can be maintained.

The above described arrangements may be employed with any of the devices hereinbefore described.

What we claim is:—

1. Speed changing mechanism comprising a driving element, a driven element, a rotary surface on the driven element, extensible members attached to the driving element, engaging devices pivotally attached to said extensible members for engaging said rotary surface, means for moving the driving and driven elements relatively to each other whereby said members become eccentrically disposed with respect to each other, and variable means for causing the engaging devices to co-act with the rotary surface for varying periods whereby the driven element is driven at variable reduced speeds below the speed of the driving member.

2. Speed changing mechanism comprising a driving member, a driven member, a rotary surface on the driven member, extensible members attached to the driving member, engaging devices attached to said extensible members for engaging said surface, means for producing eccentricity between the driving and driven members, two cam plates mounted on the driven member, arranged one behind the other, a slotted arm on each cam plate, fixed pins engaging said slots.

3. Speed changing mechanism comprising a driving member, a driven member, a grooved member on the driven member, extensible members attached to the driving member, double acting engaging members carried by said extensible members for engaging said grooved member, means for producing eccentricity between the driving and driven members, two cam plates mounted on the driven member, arranged one behind the other, a slotted arm on each cam plate, and fixed pins engaging said slots, whereby the speed of the driven member is reduced when the driving and driven members are eccentrically disposed to each other.

4. Speed changing mechanism comprising a driving member, a driven member, a rotary surface on the driven member, extensible members attached to the driving member, engaging devices attached to said extensible members for engaging said surface, a compound edge cam on the driven member, means for producing eccentricity between the driving and driven members and for simultaneously and automatically varying the effective length of the cam as the relative position of the driving and driven members is varied, whereby certain of the devices engaging the rotary surface on the driven member are lifted by the variable cam out of contact therewith to reduce the speed of said driven member.

5. Speed changing mechanism comprising a driving member, a driven member, a grooved member on the driven member, pivoted links attached to the driving member and loosely mounted on the driven member, friction pawls carried by said links adapted to engage with said grooved member, a cam composed of two plates arranged one behind the other mounted on the driven member, means for moving the driving member eccentric to the driven member and for automatically moving one of said plates relatively to the other plate whereby the effective length of said cam is varied simultaneously with the change in position of the driving and driven members whereby the faster moving pawls are lifted out of contact with the grooved member for a period varying with the different eccentric positions of the driving and driven members to produce various reduced speeds of the latter member.

6. Speed changing mechanism comprising a driving member, a driven member, an internally grooved drum on the driven member, a flanged plate on the driving member, drum engaging members, extensible members carrying said drum engaging members suitably connected with the driving and driven members, means for producing eccentricity between the driving and driven members, two cam plates mounted on the driven member, arranged one behind the other, a slotted arm on each cam plate, and fixed pins engaging said slots whereby when the driving and driven members are eccentrically disposed to each other the drum is driven at variable reduced speeds below the speed of the driving member.

7. Speed changing mechanism comprising a driving member, a driven member, means for producing eccentricity between such members, a grooved member on the driven member, extensible members connected to the driving member, double acting engaging members carried by said extensible members for engaging said grooved member, each engaging member being formed in two parts, means for normally holding said parts together, two cam plates mounted on the driven member, arranged one behind the other, adapted to coact with the engaging members, a slotted arm on each cam plate, and fixed pins engaging said slots whereby the speed of the driven member is reduced when the driving and driven members are eccentrically disposed to each other.

In witness whereof we have hereunto set our hands in the presence of two subscribing witnesses.

JOHN DRURY.
FRANK JAMES GRAY.

Witnesses:
EDWARD TRUMP FOSTER,
HERBERT D. JAMESON.

Copies of this patent may be obtained for five cents each, by addressing the "Commissioner of Patents, Washington, D. C."